United States Patent
Uraki

(10) Patent No.: US 8,016,377 B2
(45) Date of Patent: Sep. 13, 2011

(54) INKJET RECORDING APPARATUS

(75) Inventor: Shingo Uraki, Machida (JP)

(73) Assignee: Konica Minolta Holdings, Inc., Tokyo (JP)

( * ) Notice: Subject to any disclaimer, the term of this patent is extended or adjusted under 35 U.S.C. 154(b) by 413 days.

(21) Appl. No.: 12/238,149

(22) Filed: Sep. 25, 2008

(65) Prior Publication Data

US 2009/0141058 A1   Jun. 4, 2009

(30) Foreign Application Priority Data

Nov. 30, 2007   (JP) ................................. 2007-310050

(51) Int. Cl.
 *B41J 29/38* (2006.01)
(52) U.S. Cl. ........................................................ 347/11
(58) Field of Classification Search ................ 347/9–11, 347/69
See application file for complete search history.

(56) References Cited

U.S. PATENT DOCUMENTS

| | | | |
|---|---|---|---|
| 4,972,211 A | 11/1990 | Aoki | |
| 5,903,286 A | 5/1999 | Takahashi | |
| 5,980,013 A | 11/1999 | Takahashi | |
| 6,260,959 B1 | 7/2001 | Takahashi | |
| 6,676,238 B2 * | 1/2004 | Fujimura et al. | 347/11 |
| 2004/0061731 A1 | 4/2004 | Fujimura et al. | |
| 2006/0125856 A1 | 6/2006 | Kitami et al. | |
| 2006/0279594 A1 | 12/2006 | Hasegawa | |
| 2007/0193508 A1 | 8/2007 | Komatsu | |

FOREIGN PATENT DOCUMENTS

| | | |
|---|---|---|
| JP | 11-316380 A | 11/1999 |
| JP | 2007-25334 A | 2/2007 |

OTHER PUBLICATIONS

Extended European Search Report dated Mar. 26, 2009, 8 pages, issued in counterpart European Application No. EP 08253076.7-1251.

* cited by examiner

*Primary Examiner* — Julian D Huffman
(74) *Attorney, Agent, or Firm* — Holtz, Holtz, Goodman & Chick, PC

(57) ABSTRACT

An inkjet recording apparatus has a head which includes, a plurality of nozzles each of which jets ink containing spacer beads dispersed therein on a substrate; a plurality of pressure chambers each of which communicates with each of the nozzles; and an plurality of electromechanical transducers which change a capacity of each of the pressure chambers by applying a voltage pulse, wherein the ink is jetted from each of the nozzles by applying to each of the electromechanical transducers the voltage pulse which includes a first pulse for increasing the capacity of the pressure chamber and then decreasing the capacity after a lapse of a predetermined time, wherein, when a half of an acoustic resonance period of a pressure wave in the pressure chambers is assumed as AL, a width of the first pulse is twice of the AL or more.

5 Claims, 8 Drawing Sheets

INKJET RECORDING APPARATUS

RELATED APPLICATION

This application is based on Japanese Patent Application No. 2007-310050 filed on Nov. 30, 2007 in Japan Patent Office, the entire content of which is hereby incorporated by reference.

TECHNICAL FIELD

The present invention relates to an inkjet recording apparatus.

BACKGROUND

A liquid crystal display apparatus displays an image by using an electric field to adjust the light transmittance of a liquid crystal. This liquid crystal display apparatus drives the liquid crystal using the electric field formed between the pixel electrode and the common electrode arranged opposite to each other on the upper substrate and lower substrate.

The liquid crystal display apparatus includes a thin-film transistor array substrate (lower plate) and a color filter array substrate (upper plate) arranged opposite to each other; spacer beads (hereinafter referred to as "spacer" in some cases) for maintaining the cell gap constant between these two substrates; and a liquid crystal which fills the cell gap.

The thin-film transistor array substrate includes multiple signal wires, thin-film transistors, and alignment films recorded thereon for aligning the liquid crystal. The color filter array substrate contains a color filter for realizing colors, a black matrix for preventing light leakage, and an alignment film recorded thereon for aligning the liquid crystal.

According to the conventional art, this spacer is sprayed on a substrate according to the spray process and others using a spacer spraying apparatus.

However, this method of spraying tends to result in uneven distribution of spacer. Especially when the spacer is coagulated inside the display pixel, the coagulation becomes noticeable and display integrity is reduced. Such a problem occurs in the conventional method. Another problem is that, when a substrate provided with active element such as TFT is used, the TFT tends to break easily when force is applied to the substrate if a spacer lies at the projecting TFT portion.

To solve this problem, it is preferred to specify a spacer arrangement site, to avoid a TFT portion, or to arrange the spacer on a light shielding portion. Proposed solutions to this problem include the method of arranging the space by printing and the method by using an inkjet recording apparatus to supply the spacer to a specific position.

Of these methods, the method of supply using an inkjet recording apparatus ensures each spacer to be placed at an almost accurate position. Use of an inkjet head provided with multiple nozzles ensures simultaneous placing of a great number of spacers at specified positions. Thus, this method has an advantage of high productivity.

However, the aforementioned inkjet recording apparatus for emitting spacers has a disadvantage of allowing an jetting error to occur frequently, as compared with the case of conventional ink.

One of the techniques proposed so far to solve such a problem is the method of observing the state of jetting to provide maintenance. Examples include the method of observing the jetting of spacers with a camera and cleaning the head (Japanese Unexamined Patent Application Publication No. 11-316380) and the method of detecting early the status of spacers being coated, whereby required repair work is performed (Japanese Unexamined Patent Application Publication No. 2007-25334).

The inkjet recording apparatus for jetting spacer is required to use the ink containing large-sized spacer beads normally having a diameter of several microns, unlike the conventional color ink, and jet the spacer. Accordingly, mist or satellite tends to be produced at the time of jetting, as compared to the conventional ink. This causes the ink droplets to vibrate and requires some measures to be taken to ensure stable jetting of ink droplets.

SUMMARY

One aspect of the present invention is an inkjet recording apparatus comprising a head which includes, a plurality of nozzles each of which jets ink containing spacer beads dispersed therein on a substrate;

a plurality of pressure chambers each of which communicates with each of the nozzles; and an plurality of electromechanical transducers which change a capacity of each of the pressure chambers by supplying a voltage pulse to each of the electromechanical transducers, wherein the ink is jetted from each of the nozzles by applying to each of the electromechanical transducers the voltage pulse which includes a first pulse for increasing the capacity of the pressure chamber and then decreasing the capacity of the pressure chamber after a lapse of a predetermined time, wherein, when a half of an acoustic resonance period of a pressure wave in the pressure chambers is assumed as AL, a width of the first pulse is twice of the AL or more.

DESCRIPTION OF THE PREFERRED EMBODIMENT

Referring to drawings/the following describes the embodiments of the present invention: It should be noted, however, that the following description does not restrict the technological scope or the meaning of the terminology utilized in the Claims of the present invention. It should also be noted that the following affirmative description in the embodiment of the present invention represents the best mode, without the meaning of the terminology or the technological scope of the present invention being restricted thereby.

First Embodiment

<Inkjet Recording Apparatus>

Figure 1:
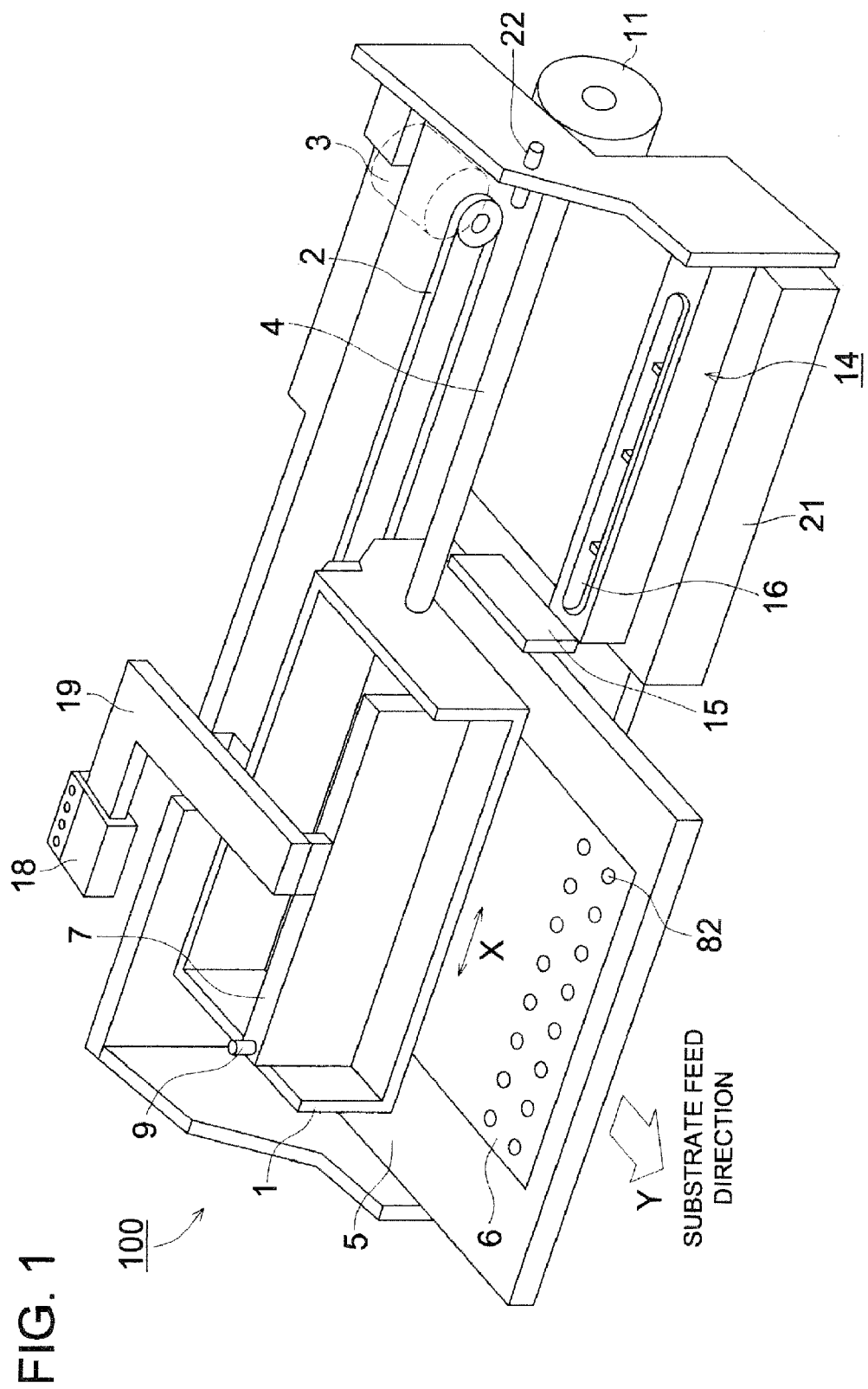
FIG. 1 is a perspective view representing the major components in a first embodiment of an inkjet recording apparatus.
Figure 2:
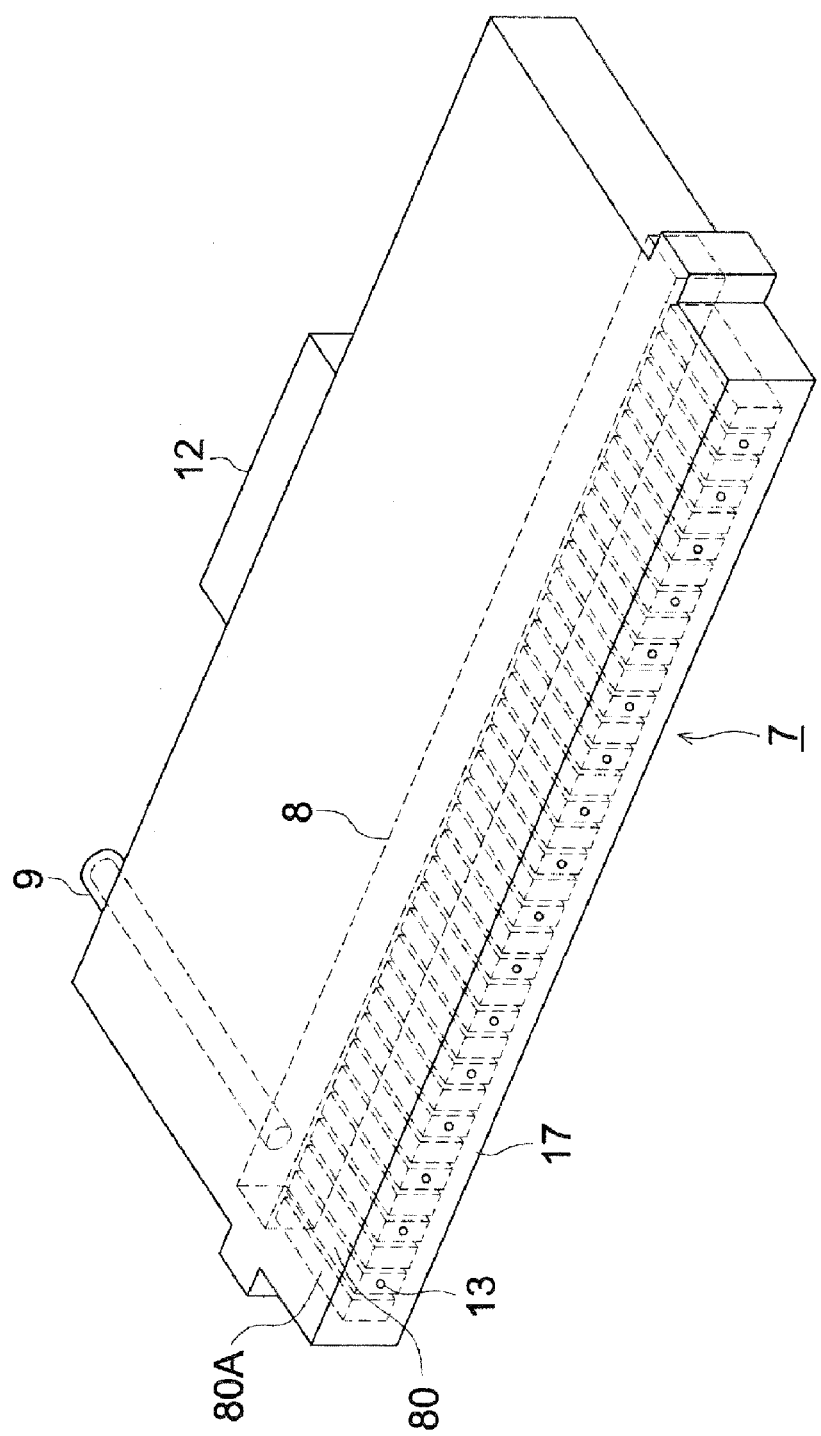
FIG. 2 is a perspective view representing the head of the inkjet recording apparatus.

The following describes the inkjet recording apparatus with reference to FIG. 1 as a perspective view representing the major components in a First embodiment of an inkjet recording apparatus, and FIG. 2 as a perspective view representing the head used in the inkjet recording apparatus. It should be noted that FIG. 2 is a schematic diagram showing the head wherein an electrode is not illustrated.

In the inkjet recording apparatus 100, the reference numeral 1 denotes a carriage, which is connected to part of the timing belt 2; and is driven by the forward and reverse rotation of a carriage motor 3. The carriage 1 is then guided by a guide member 4, and performs reciprocating motion in parallel along a XYθ-stage 5, as shown by the arrow X of the drawing.

The reference numeral 7 denotes a head for jetting ink with spacer beads dispersed therein The head 7 includes a plurality of nozzles 13 for ink jetting formed in the direction perpendicular to the direction of conveying the thin-film transistor array substrate 6, and is structured integrally with the carriage 1.

The head 7 includes a plurality of cylindrical pressure chambers 80 and a plurality of air chambers 80A, wherein the cylindrical pressure chambers 80 and air chambers 80A are separated by partitions at least partially made up of piezoelectric elements and are formed alternately with each other. One end of each of the pressure chambers 80 communicates with a common liquid chamber 8 so that ink will flow inside. The other end of each of the pressure chambers 80 communicates with a plurality of nozzles 13 formed on the nozzle surface 17, and the ink pressured by piezoelectric element in each pressure chamber 80 is jetted from each nozzle 13. The one end of each air chamber 80A does not communicate with the common liquid chamber 8 so that ink does not flow inside. The nozzle 13 of the nozzle surface 17 is not formed on the other end of each air chamber 30A.

The piezoelectric element corresponds to the electromechanical transducer of the present embodiment.

In this case, the flow paths functioning as pressure chambers wherein ink is supplied as in the present embodiment and those functioning as air chambers wherein ink is not supplied can be alternately arranged. All the flow paths can be structured to function as pressure chambers, without an air chamber being installed. In the former case, the partition can be driven easily without adversely affecting other adjacent pressure chambers, even if the partition of the pressure chamber has been subjected to shear deformation.

The present embodiment includes a partition which is at least partly made of a piezoelectric element and is polarized in a predetermined direction; a plurality of pressure chambers separated by the partition; and a drive electrode provided on the aforementioned partition. Pulses of a predetermined voltage are applied to the drive electrode, whereby electric field acts on the partition to cause shear deformation to the partition, and ink droplets are jetted.

A supply inlet is formed on the upper portion of the common liquid chamber 8 and is structured to communicate with the ink communication port 9.

A plurality of nozzles 13 for jetting ink are arranged opposed to the XYθ-stage 5, and are used for recording on the thin-film transistor array substrate 6 of the XYθ-stage 5.

The thin-film transistor array substrate 6 together with the XYθ-stage 5 is conveyed by the conveying motor 11 in the direction shown by the arrow Y.

The reference numeral 14 denotes the capping device that covers the nozzle surface 17 of the head 7, and is provided outside the area wherein the thin-film transistor array substrate is conveyed. Further, the capping device 14 serves as an ink recovering device for recovering the ink jetted from the head 7.

The reference numeral 15 is a cleaning device, which comes in contact with the nozzle surface 17 of the head 7 to clean the same when the carriage 1 performs reciprocating motion. Further, the cleaning device 15 is located outside the area wherein the thin-film transistor array substrate is conveyed, similarly to the case of the capping device 14, and is arranged on the side closer to the area wherein the thin-film transistor array substrate is conveyed, than the capping device 14.

The reference numeral 18 is a control device made up of a CPU (Central Processing Unit), work memory and others. The control device 18 controls a series of operations of the inkjet recording apparatus 100, for example, the drive of the conveying motor, movement of the head 7, jetting of ink droplets, capping operation by the capping device 14, and operations of the spacer density regulation section 600 and drive signal generation section 500. Further, the control device 18 is connected with the head 7 through the drive signal generation section 500 (FIG. 5) provided with a circuit for generating the voltage pulse (to be described later).

The reference numeral 19 indicates a cable to provide electrical connection between the connector 12 of the head 7 and control device 18.

The reference numeral 21 indicates a waste liquid reservoir for storing the ink which is preliminarily jetted from the head 7 and thus recovered by the capping device 14.

The reference numeral 22 denotes a home position sensor made up of a photoelectric sensor and others. It senses the lateral surface of the carriage 1, detects the wait position of the carriage 1—i.e., the position wherein the nozzle surface 17 of the head 7 is detected by the capping device 14.

When the apparatus has started recording/the head 7 at the capping position is moved by the carriage motor 3 to the start position of the record area in response to the control signal indicating the start of recording from the control device 18, whereby the position is fixed. When the electric signal conforming to the jetting data from the control device 18 is applied to the piezoelectric element of the head 7 through the drive signal generation circuit 500, the ink with spacer beads dispersed therein is jetted from the appropriate nozzle, whereby recording is performed on the thin-film transistor array substrate of the XYθ-stage 5. The thin-film transistor array substrate is fed out in the direction Y in conformity to the jetting of ink from the head 7 and the aforementioned recording operation is performed until the processing in response to the predetermined jetting data terminates.

Figure 3:
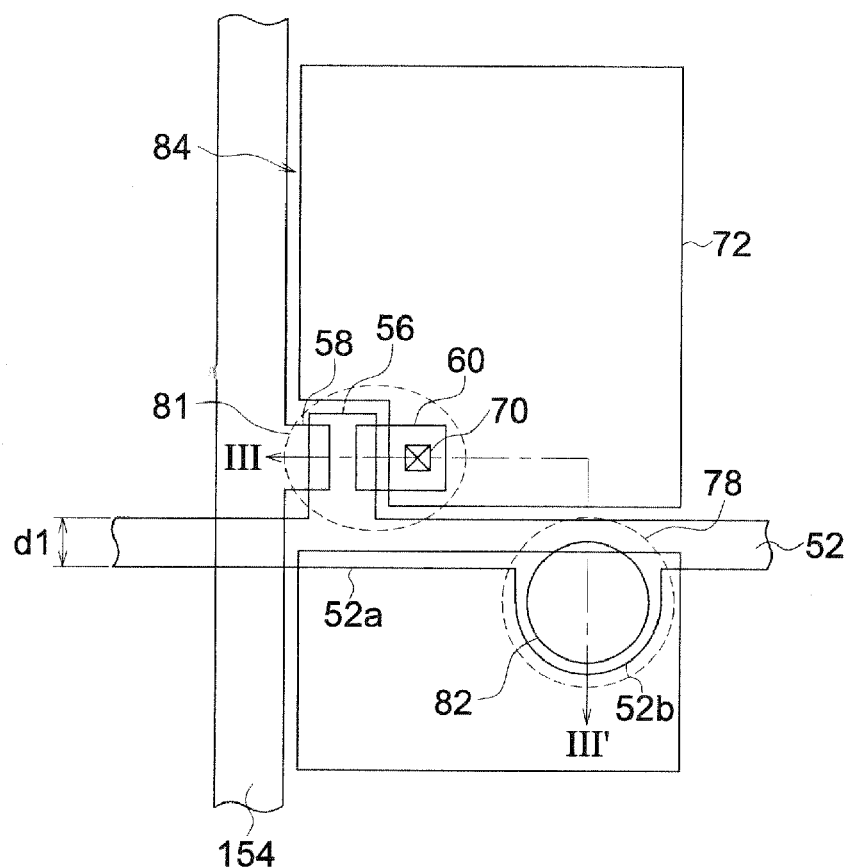
FIG. 3($a$) is a plan view showing the thin-film transistor array substrate, and FIG. 3($b$) is a cross section taken along arrow line III-III' of FIG. 3($a$) showing the thin-film transistor array substrate.
Figure 3:
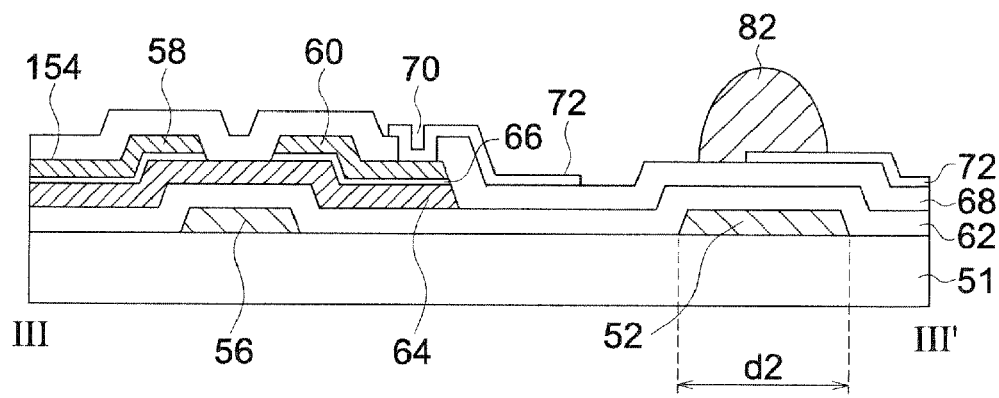

To put it more specifically, the dispersion liquid of spacer 82 is sprayed at the predetermined positions (to be described later with reference to FIG. 3) so that the solvent volatilizes, whereby spacers 82 can be placed at predetermined positions.

<Ink with Spacer Dispersed Therein>

Any spacer having a diameter permitting jetting from the nozzle of the head 7 can be used in the present embodiment. The spacer diameter differs according to the purpose of use. For the liquid crystal display element, the space diameter is determined in conformity to the thickness (cell thickness) of the liquid crystal layer sealed in the liquid crystal apparatus. Normally the spacer diameter is in the range of 1 through 10 μm. The diameter can be defined by volume average bead sizes and is much greater than the pigment particle size (0.1 μm in diameter) of the commonly used ink with pigment dispersed therein. Further, the diameter of the nozzle 13 of the head 7 is preferably in the range of 20 through 40 (μm). A nozzle having a diameter of 30 (μm) is used in the present embodiment. The diameter of this nozzle can be defined as the diameter on the cross section at the front end of the nozzle section on the ink jetting side. It indicates the diameter when the cross section is circular. If the cross section is not circular, it refers to the diameter when the non-circular form is converted into a circle having the same area as the sectional area Further, these spacers 82 can be prepared by globular members made up of such resins as silicon dioxide and polystyrene.

Any solvent that can be jetted from the head 7 can be used as the solvent wherein spacer is dispersed. A volatile organic solvent, dilute solution based solvent or solvent of the mixture thereof is normally utilized. The ratio between the spacer and solvent can be set in the range that ensures jetting from the nozzle of the head 7.

The spacer density is preferably lower, but one or more beads are preferably included in one ink droplets. The spacer density is more preferably 0.5 percent by volume or more without exceeding 20 percent by volume. For example, the volume ratio between 15 picoliters of ink droplets and globular spacer beads having a diameter of 4 μm is 434 to 1. One percent by volume signifies that one ink droplet contains four globular spacer beads on average.

In the present embodiment, the spacer 82 is uniformly dispersed at a predetermined density by ultrasonic wave and others in a single solvent or two types of the aforementioned solvent mixture selected from among the dilute solution, isopropyl alcohol and ethanol, whereby a spacer dispersed solution is prepared.

<Arrangement of Spacer on Substrate>

FIG. 3(a) is a plan view showing the thin-film transistor array substrate 6 of the embodiment, and FIG. 3(b) is a cross section taken along arrow line III-III' of FIG. 3(a) showing the thin-film transistor array substrate.

Referring to FIG. 3(a) and FIG. 3(b), the thin-film transistor array substrate includes a gate line 52 formed on the lower substrate 51 with selectively varying widths; a data line 154 formed to cross the gate line 52 by intervening the gate insulation film 62; a thin-film transistor 81 formed on the crossing portion; a pixel electrode 72 formed on the pixel area 84 provided on the crossing structure; a storage capacitor 78 formed at the superimposed section between the pixel electrode 72 and gate line 52; and a spacer 82 formed so as to be superimposed on the gate line 52.

The gate line 52 supplies the gate signal to the gate electrode 56 of the thin-film transistor 81. This gate line 52 includes a line section 52a for defining the pixel area 84 and a projection 52b projecting from the line section 52a. The line section 52a is formed to have width d1, and serves to avoid reduction of the aperture ratio of the pixel electrode 72 by the projection 52b. The projection 52b is formed to have a width d2 which is relatively greater than the line section 52a, in the area wherein the spacer 82 is formed by being jetted by the inkjet recording apparatus 100. For example, the projection 52b is formed in such a way that the width parallel with the data line 154 is about 30 through 50 μm, and the width perpendicular to the data line 154 is about 30 through 50 μm. This projection 52b is formed in a circle that is wider than the circular spacer 82.

The spacer 82 maintains the cell gap between the thin-film transistor array substrate and color filter array substrate. This spacer 82 is formed in the projection area of the gate line 52 that is superimposed on the black matrix (not illustrated) of the color filter array substrate, using the inkjet recording apparatus 100. To be more specific, the spacer 82 is formed to be superimposed with the storage capacitor 78.

As described above, the spacer is placed on the opaque gate line 52, not on the transparent liquid crystal electrode. This arrangement is preferably utilized without image quality being deteriorated. The inkjet system provides an ideal means because spacer beads can be placed at such specified positions.

<Ink Supply System>

Referring to FIG. 4(a) and FIG. 4(b), the following describes the embodiment of the ink supply system provided with a spacer density regulation section 600.

FIG. 4(a) is a conceptual diagram representing an embodiment of the ink supply system applied to the inkjet recording apparatus of the present invention. The ink flow path 23 is a flow path insulated from atmospheric environment. Spacer beads are dispersed in the ink to be used. Further, FIG. 4(b) is a conceptual diagram representing the details of the spacer density regulation section 600.

The reference numeral 40 indicates a sub-reservoir having a hole for communicating with atmospheric air, and the sub-reservoir contains the ink wherein spacer beads are dispersed and these spacer beads have been regulated to have a predetermined density by the spacer density regulation section. Passing through the ink flow path 23, this ink is supplied to the head 7.

The ink reservoir 20 contains the ink wherein spacer beads of high density are dispersed. In the present embodiment, 10 percent by volume of spacer beads are dispersed in this ink.

The dilute solution reservoir 403 stores the dilution solution for diluting the ink wherein spacer beads of high density is dispersed The same or similar compound to that of the solvent constituting the ink wherein spacer beads are dispersed is preferably used as the dilute solution.

The flow path 24 is a flow path connecting the ink reservoir 20 and dilute solution reservoir 403 with the sub-reservoir 40, and is provided with a spacer density regulation section 600.

The present embodiment includes a spacer density regulation section for mixing the ink containing high-density spacer dispersed therein and dilute solution at a predetermined proportion. To put it more specifically, as shown in FIG. 4(a) and FIG. 4(b), the dilute solution supplied from the dilute solution reservoir 403 and the ink containing high-density spacer dispersed therein supplied from the ink reservoir 20 are conveyed and mixed at predetermined proportion, using pumps MP12 and MP11, respectively, and are supplied to the sub-reservoir 40.

To put it more specifically, the dilute solution in the dilute solution reservoir 403 and the ink containing high-density spacer dispersed therein in the ink reservoir 20 are mixed by the dilute solution conveying pump MP12 and ink conveying pump MP11, respectively. Thus, the mixed ink containing a predetermined spacer density is supplied to the sub-reservoir 40.

The following describes the method of diluting by mixing the high-density ink and dilute solution of the present embodiment. FIG. 4(b) shows an example of how the dilute solution conveying pump MP12 and ink conveying pump MP11 are alternately driven and the high-density ink and dilute solution are alternately fed to the mixing flow path L13. While the high-density ink and dilute solution having been alternately fed go along the mixing flow path L13, they are diffused and mixed to form a dilute mixture ink, and are supplied to the sub-reservoir 4. Although not illustrated in FIG. 4(b), each of the pumps MP11 and MP12 is connected to a control device 18 through a drive circuit. The pump drive is controlled by the control device 18.

The mixture ratio between the high-density ink and dilute solution can be determined according to the proportions of the drive time T1 (dilute solution conveying time) and T2 (ink conveying time) for driving dilute solution conveying pump MP12 and ink conveying pump MP11, respectively.

The pump MP of the present embodiment is the micropump driven by a piezoelectric element.

In the present embodiment, stable supply of a mixture ink having a desired density to the head 7 can be ensured by installing a density sensor 402 for sensing the spacer density in ink and in the sub-reservoir 40, and a density sensor 202 for sensing the spacer density in ink in the ink reservoir 20.

Further, a suction pump 28 is installed on the flow path of the waste liquid reservoir 21 leading from the capping device 14 so that the ink of the capping device 14 and the ink of the nozzle 13 of the head 7 can be fed into the waste liquid reservoir 21.

Various forms of conventionally known pumps can be used as the suction pump 28. For example, it is possible to use the pump wherein the flow path is made of a flexible component, and part of the tube is crushed sequentially along the length of the tube by a pressing member such as a plurality of rollers, whereby ink is made to flow.

In the inkjet recording apparatus 100, when ink is replaced by changing the spacer density in ink, a communicating valve 54 is opened and the dilute solution conveying pump MP12 and ink conveying pump MP11 are driven alternately. During this operation, the nozzle surface 17 of the head 7 is sealed by a capping device 14, and the negative pressure is generated in the cap by the suction pump 28 connected with the cap, whereby the liquid ink containing spacer beads of a new density is fed into the head 7, and the ink containing spacer beads having the density prior to replacement and the liquid ink containing spacer beads of a new density are completely replaced. The waste liquid generated in this case is held in the waste liquid reservoir 21.

Figure 4:
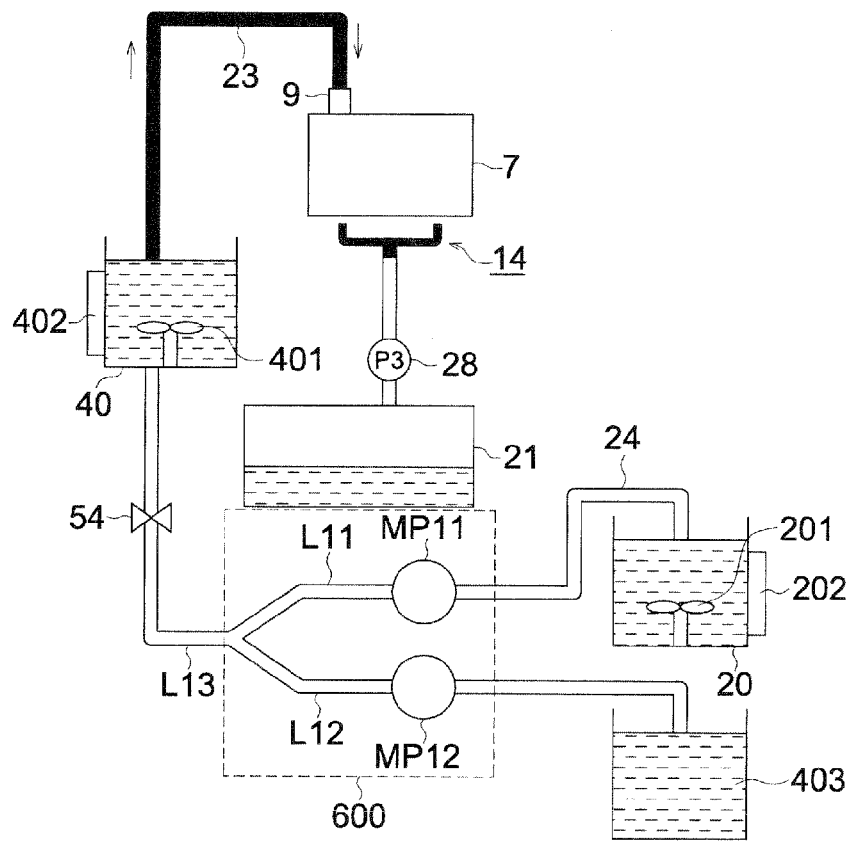
FIG. 4($a$) is a conceptual diagram representing an embodiment of the ink supply system applied to the inkjet recording apparatus, and FIG. 4($b$) is a conceptual diagram representing the details of the spacer density regulation section.
Figure 4:
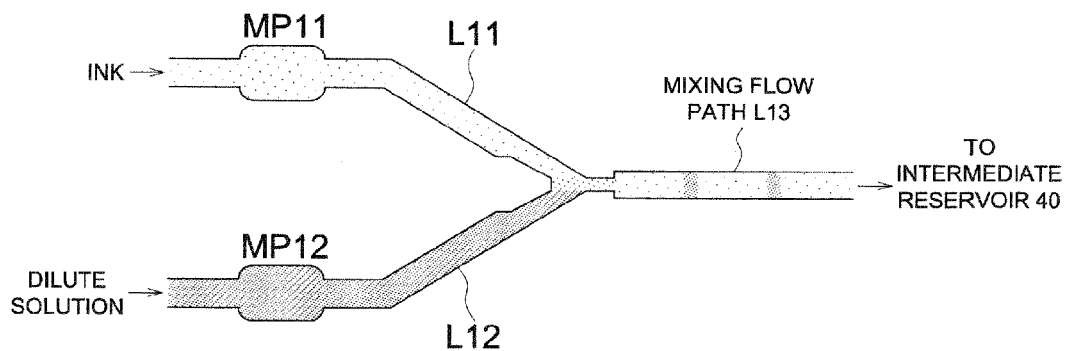

In FIG. 4, the reference numeral 201 indicates a stirring screw installed in the ink reservoir 20, and 401 denotes a stirring screw fitted in the sub-reservoir 40.

As described above, the stirring screw 401 is installed in ink in the sub-reservoir 40 and the stirring screw 201 is installed in ink in the ink reservoir 20. Each of these screws can be driven at a high speed by a motor. The stirring screw 201 and stirring screw 401 are designed to be rotating at all times regardless of the ink jetted from the head 7. The rotation of the stirring screw applies a shearing force to the ink stored in the sub-reservoir 40 and ink reservoir 20, thereby preventing the spacer beads contained in the ink from being coagulated. Further, the stirring screw 401 uniformly mixes the mixture ink having been fed.

<How to Drive the Head>

FIG. 5(a)-(C) are a cross sectional views showing the head 7 of FIG. 2, showing the operation in the ink jetting node. In FIG. 5(a)-(C), 13 denotes a nozzle, 124 a cover plate, 26 a substrate and each 27A, 27B, - - - a partition. A pressure chamber 80 and air chamber 80A are formed by partitions 27A, 27B, - - - cover plate 124 and substrate 26.

As shown in FIG. 5(a)-(C), the head 7 is a shear mode tripe head 7 wherein multiple pressure chambers 80 and air chambers 80A separated by a plurality of partitions 27A, 27B, 27C, - - -, made up of a piezoelectric material such as PZT as a piezoelectric element are arranged alternately between the cover plate 124 and substrate 26. FIG. 5(a)-(C) show three heads as part of multiple pressure chambers 80 and air chambers 80A. One end of the pressure chamber 80 (hereinafter referred to as "nozzle end" in some cases) is connected with the nozzle 13 formed on the nozzle forming member. The other end (hereinafter referred to as "manifold end" in some cases) is connected with a common ink chamber 8. Electrodes 29A, 29B and 29C linked from above both partitions 27A, 27B, 27C, - - - over the bottom surface of the substrate 26 are formed in close contact with the surface of the partition 27 in each of the pressure chambers 80 and air chambers 80A. Each of the electrodes 29A, 29B and 29C is connected with the drive signal generation section 500. This drive signal generation section 500 outputs a voltage pulse.

Further, an insulating protective film is formed on the surface of each electrode in contact with the ink. Polyparaxylylene is preferably used as a protective film.

Figure 5:
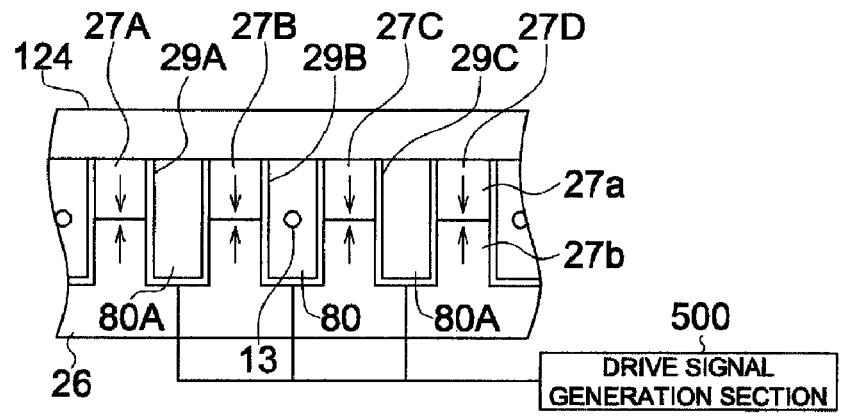
FIGS. 5($a$) through ($c$) are a cross section representing the operation when ink is jetted from the head.
Figure 5:
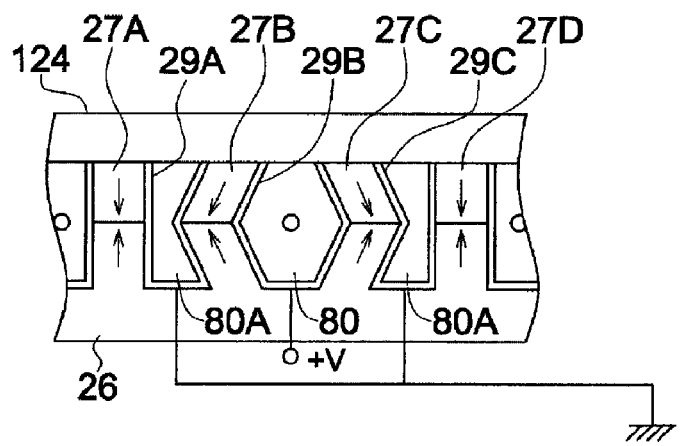
Figure 5:
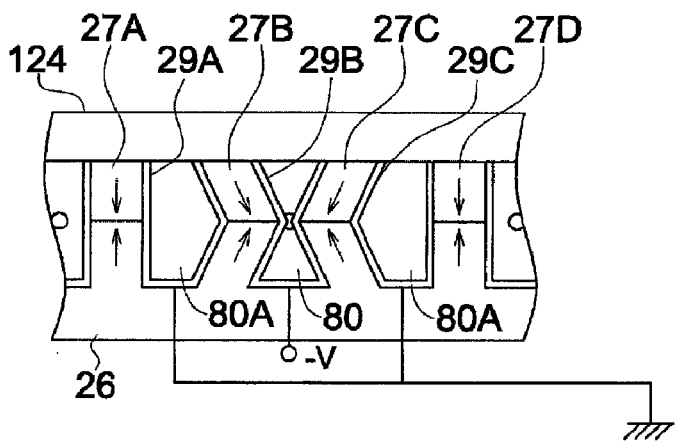

In this case, each of the partitions 27A, 27B, 27C, - - - is made of two piezoelectric materials 27a and 27b having different directions of polarization, as shown by an arrow of FIG. 5. The piezoelectric material can be only the portion indicated by reference numeral 27a and is required to be used at least part of the partition 27.

When voltage pulse is applied to the electrodes 29A, 29B and 29C formed in close contact with the surface of each partition 27 under the control of the drive signal generation section 500, ink containing the spacer beads in the pressure chamber 80 is jetted as Ink droplets from the nozzle 13 by the operation procedure shown below:

In the first place, when voltage is not applied to any of the electrodes 29A, 29B and 29C, none of the partitions 27A, 27B and 27C are subjected to deformation. However, in the status shown in FIG. 5(a), the electrodes 29A and 29C are connected to the ground, and the first pulse made up of a rectangular wave is applied to the electrode 29B in such a way that the capacity of the pressure chamber 80 is increased and is then decreased after the lapse of a predetermined time period. This will generate an electric field perpendicular to the direction of polarization of the piezoelectric material constituting the partitions 27B and 27C, together with each of the partitions 27B and 27C, and shear deformation is produced on the joint surface of the partitions 27a and 27b. As shown in FIG. 5(b), the partitions 27B and 27C are deformed mutually toward the outside, whereby the capacity of the pressure chamber 80 is increased and a negative pressure is produced inside the pressure chamber 80 so that ink flows inside (drawing).

When the electric potential is set back to zero (0) from this status, then the partitions 27B and 27C come back to the neutral position of FIG. 5(a) from the expanded position of FIG. 5(b) and a high pressure is applied to the ink in the pressure chamber 80 (Release). The second pulse made of the rectangular wave is applied to decrease the capacity of the pressure chamber 80 as shown In FIG. 5(c), wherein this rectangular wave decreases the capacity of the pressure chamber 80, and then increases it after the lapse of a predetermined time to ensure that the partitions 27B and 27C are deformed in the directions reverse to each other. Then a positive pressure is generated in the pressure chamber 80 (Reinforce). Thus, the ink meniscus in the nozzle by part of the ink filling the pressure chamber 80 is changed in the direction of being pushed out of the nozzle. When this positive pressure has increased to the level of jetting ink droplets from the nozzle, then the ink droplets are jetted from the nozzle. Other pressure chambers also perform in the same manner as above when a voltage pulse is applied. Such a jetting process is referred to as a DRR drive method. This drive method is representative of the shear mode head. The pulse formed of a rectangular wave is preferably used as the voltage pulse. This will enhance the drive efficiency and will facilitate setting of the pulse width.

In such a shear mode head 7, the partition is deformed by the difference in voltages applied to the electrodes provided on both sides of the wall. The same operation can be performed by grounding the electrode of the pressure chamber for ink jetting and applying a positive voltage to the electrode of both the ad accent air chambers, instead of applying a negative voltage to the electrode of the pressure chamber for ink jetting. According to the latter method, drive can be achieved by the positive voltage alone, and this is a preferred mode of embodiment.

Figure 6:
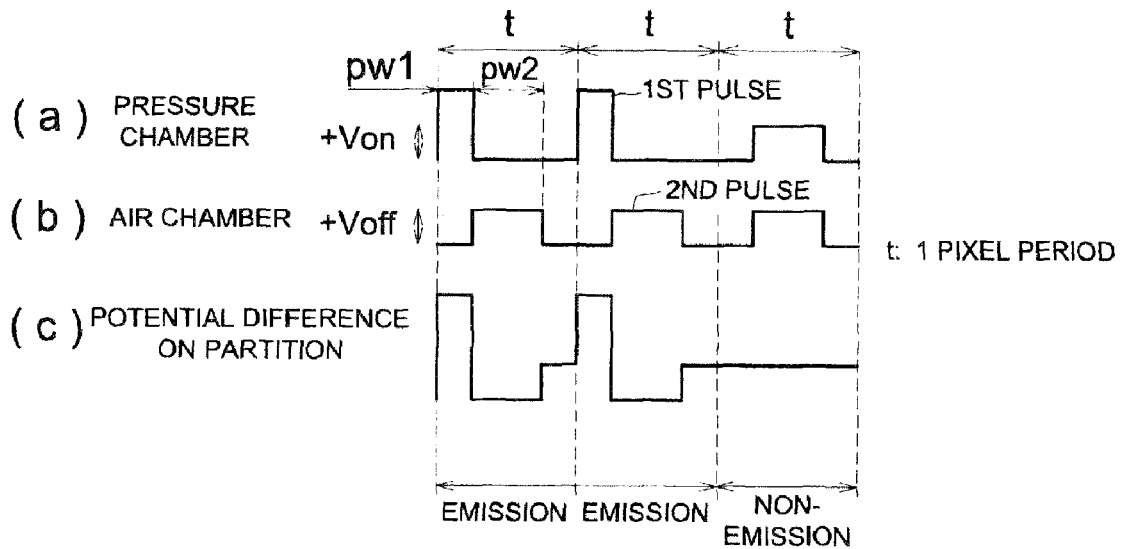
FIG. 6 is a timing chart showing the pulse waveform applied to the pressure chamber and air chamber when ink is jetted.

Referring to FIG. 6, the following further describes the jetting procedure wherein drive is performed by application of positive voltage alone.

FIG. 6 shows the pulse waveform representing the timing of applying each voltage pulse when the front two of the three continuous pixels jet ink droplets and the rear one does not. One pulse waveform for applying voltage pulses per unit time (one-pixel period t) is generated and each pulse waveform is controlled, thereby setting the mode of jetting/non-jetting of ink droplets forming one pixel, as shown in FIG. 6. In the air chamber 80A, the second pulse is applies continuously on a predetermined cycle ((b) of FIG. 6). In the meantime, in the pressure chamber 80, the first pulse is applied only when the ink droplets are jetted, whereby one ink droplet is jetted by the voltage pulse made up of the first pulse and second pulse. One dot on the substrate 6 is formed by these ink droplets. (c) of FIG. 6 shows the difference in electric potential between the electrodes in this case. In the pulse waveform of FIG. 6, the two waveforms on the front side out of the three pulse waveforms of the pressure chamber 80 are used as voltage pulse waveforms. This permits continuous jetting of the ink droplets for two pixels. The first waveform on the rear side is the same as the second pulse waveform. Thus, while the pulse voltage of the second pulse waveform on the rear side is applied, any difference in potential does not occur between the electrodes of the pressure chamber and air chamber, and the aforementioned shear deformation does not occur. Thus, ink droplets are not jetted. This arrangement allows the ink droplets dots to be formed in response to the image data by controlling the pulse of the voltage pulse waveform.

In the voltage pulse of FIG. 6, the ratio between the drive voltage Von (V) of the first pulse and the drive voltage Voff (V) of the second pulse is preferably set at |Von|>|Voff|. As described above, if the relation of |Von|>|Voff| is met, ink can be effectively supplied into the ink channel. This is preferable especially when ink is highly viscous and high-frequency drive is performed. It should be noted that the reference voltage of this voltage Von and voltage Voff is not always 0 (zero). The voltage Von and voltage Voff each are the voltage as the difference from the reference voltage. Further, the relation of |Von|/|Voff|=2 is more preferred.

Half the acoustic resonance period of the pressure wave in the pressure chamber is assumed to AL. In this case, setting is so made that the width of the first pulse exceeds twice the aforementioned AL. This arrangement ensures stable jetting of the ink containing spacer dispersed therein and enhances the position accuracy of the ink droplets being jetted.

This can be explained as follows: The negative pressure wave produced by the expansion at the time of starting the application of the first pulse is decreased with the lapse of time during the propagation through the pressure chamber. The pressure chamber is caused to shrink by releasing application of the expansion pulse at the time of decreasing after the lapse of twice the AL or more. Thus, the decreasing of the pressure wave is utilized to suppress the superimposition among pressure waves and the vibration of ink droplets, whereby jetting stability is enhanced.

If the width of the first pulse is excessive, the drove period will be too long. It is preferred to set the width without exceeding 12 times of the aforementioned AL.

When the width of the first pulse is set at an even number of times of the aforementioned AL, the phase of the pressure wave at the time of starting application of the first pulse will be reverse to that of the pressure wave at the time of releasing the application. This suppresses the superimposition among pressure waves, thereby enhancing jetting stability and the position accuracy of the ink droplets being jetted.

When the width of the first pulse is set at an odd number of times the aforementioned AL, the phase of the pressure wave at the time of starting application of the first pulse will be the same as that of the pressure wave at the time of releasing the application. This allows a greater positive pressure to be produced by superimposition among pressure waves, whereby ink is preferably jetted at a lower drive voltage.

The width PW2 of the second pulse is preferably set at three ALs. This suppresses generation of a satellite and ensures more stable ink jetting.

AL (Acoustic Length) can be defined as half the acoustic resonance period of the pressure chamber. This AL can be obtained as the pulse width of such the voltage pulse of the rectangular wave that the ink droplet velocity will be maximized when the voltage pulse of the rectangular wave is applied to the partition 27 as a piezoelectric element, by measuring the ink droplet velocity while the voltage value of the rectangular wave is kept constant. The pulse can be defined as a rectangular wave having a peak value of constant voltage. When 0V is assumed as 0% and the peak value voltage is assumed as 100%, the pulse width can be defined as the time between a voltage rise of 10% from 0V and a voltage fall of 10% from the voltage of peak value. Further, the rectangular wave in the sense in which it is used here refers to as the waveform wherein both the rise time and fall time of voltage between 10% and 90% do not exceed half the AL or preferably do not exceed the quarter thereof.

Figure 7:
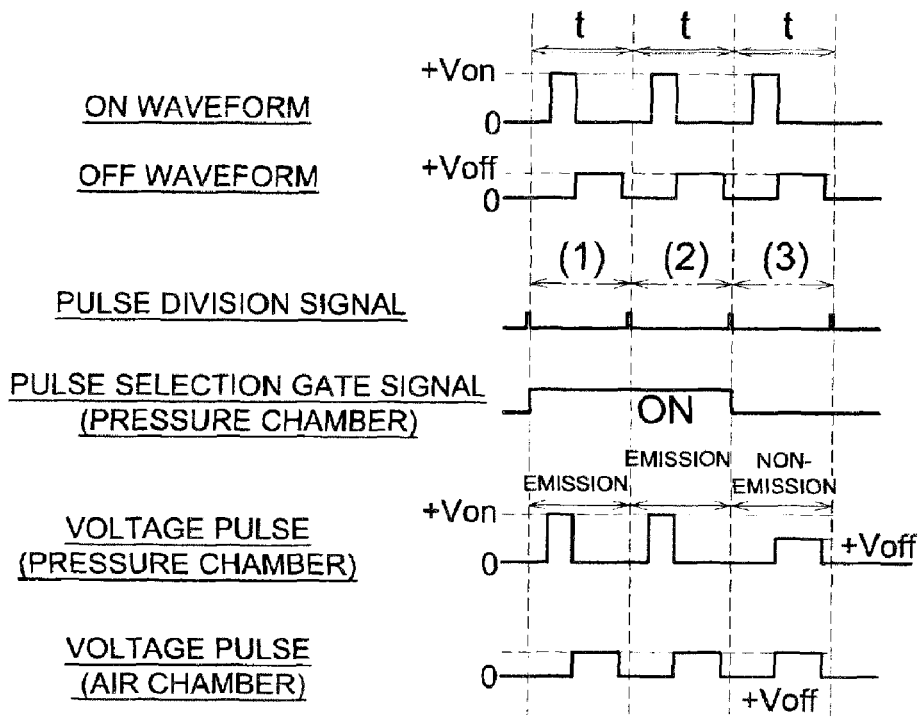
FIG. 7 is a timing chart showing the pulse waveform applied to the pressure chamber and air chamber on a selective basis when ink is jetted.

Referring to FIG. 7, the following describes the procedure of selecting the voltage pulse within each pixel:

The drive signal generation section 500 includes a drive signal generation circuit that generates a series of drive signals including a plurality of voltage pulses for each pixel period; and a voltage pulse selection circuit that selects a voltage pulse in response to each piece of pixel data out of the drive signals supplied from the aforementioned drive signal generation circuit for each pressure chamber and supplies it to each pressure chamber. In response to the data of each pixel, the drive signal generation section 500 supplies the voltage pulse for driving the partition 27 as a piezoelectric element. This voltage pulse includes the first pulse (ON waveform) and the second pulse (OFF waveform).

The ON waveform and OFF waveform of FIG. 7 indicate two types of drive signals generated by the drive signal generation circuit. The drive signals are made up of three pixel voltage pulses (1), (2) and (3) made up of the first and second pulses. This example refers to the case of jetting ink to the two pixels on the front side, as described above. Each of the ON waveform and OFF waveform each is supplied to the voltage pulse selection circuit of each pressure chamber. Under the control of the pulse selection gate signal in response to the print data of each pressure chamber, these waveforms are supplied to the electrode of each pressure chamber on a selective basis. The voltage pulse selection circuit supplies the ON waveform to the electrode of the pressure chamber when the pulse selection gate signal is high. It does not supply the ON waveform to the electrode of the pressure chamber when the pulse selection gate signal is low. FIG. 7 shows the three pixel period equivalent for driving each pressure chamber.

A pulse division signal is applied to each of the time period before and after application of each voltage pulse. When the print data of pixel is given, pulse selection gate signals synchronized with the pulse division signal are turned on in response to that print data. During the time when the pulse selection gate signal corresponding to the pressure chamber is on ((1) and (2) of FIG. 7), the ON waveform of the drive waveform is applied to the electrode of the pressure chamber. Further, the OFF waveform is always applied to the electrode of the air chamber. Thus, the partitions on both sides of the pressure chamber are subjected to displacement. During the time period of (3) of FIG. 7, the pulse selection gate signal of the pressure chamber is turned off. Accordingly, the OFF waveform is applied to the electrodes of the pressure chamber and air chamber and no partition is subjected to any displacement.

The drive signal generation circuit is configured to ensure that the first pulse (ON waveform) whose width is set at twice the AL or more can be outputted. In response to the signal from the control device 18, the first pulse (ON waveform) having a predetermined width twice the AL or more is sent to the voltage pulse selection circuit.

The aforementioned embodiment is an inkjet recording apparatus including a head provided with nozzles for jetting the ink containing spacer beads on a substrate; pressure chambers communicating with the aforementioned nozzles; and electromechanical transducers for changing the capacity of the aforementioned pressure chambers by application of voltage pulse. In this inkjet recording apparatus, the aforementioned ink is jetted from the aforementioned nozzles when the voltage pulses including the first pulse that increases the capacity of the aforementioned pressure chamber and then decreases it after the lapse of a predetermined time are supplied to the aforementioned electromechanical transducers. When half the acoustic resonance period of the pressure wave in the aforementioned pressure chamber is assumed as AL, the width of the aforementioned first pulse is set to be twice the AL or more.

This arrangement ensures to provide an inkjet recording apparatus characterized by improved jetting stability of the spacer-dispersed ink, and enhanced position accuracy of the ink droplets being jetted.

Example

Using the inkjet recording apparatus of FIG. 1, recording operations were performed by changing the width PW1 of the first pulse, wherein the nozzle of the head 7 had a diameter of 30 µm, the spacer diameter of ink was 5 µm, and spacer density was 2 (vol %) Under these conditions, the position accuracies σx and σy of ink droplets, drive voltage (Von), and the volume of ink droplets jetted were measured.

Figure 9:
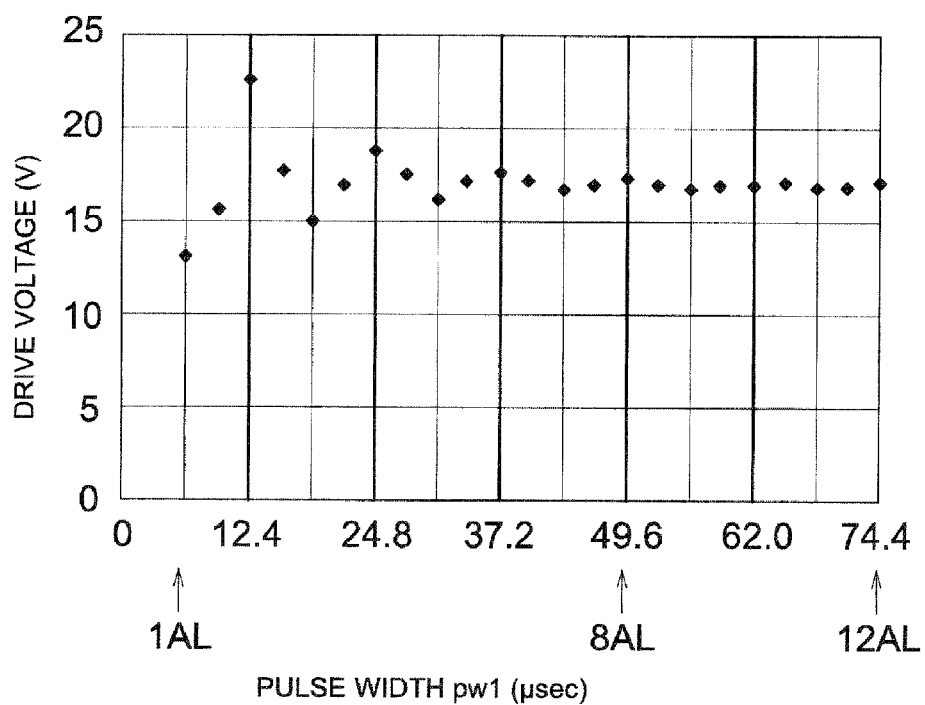
FIG. 9 is a diagram graphically representing the pulse width PW1 and drive voltage.
Figure 10:
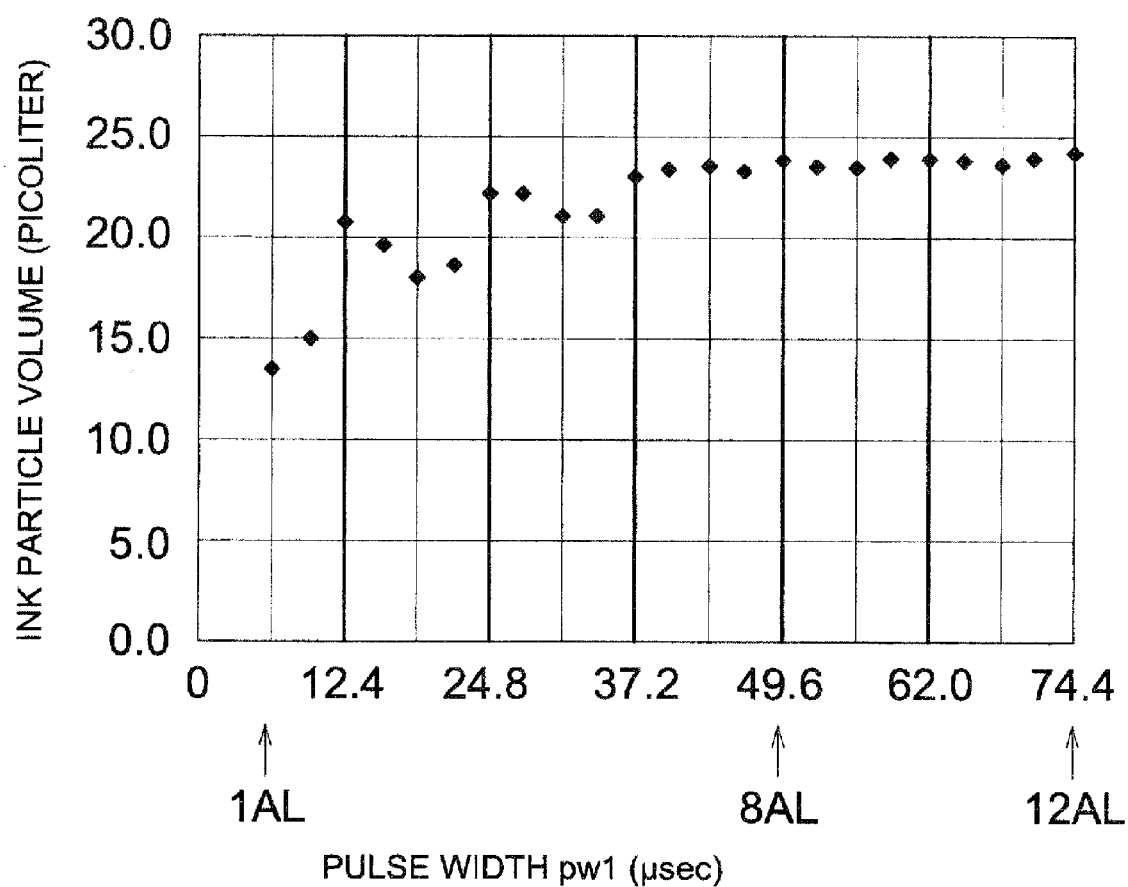
FIG. 10 is a diagram graphically representing the pulse width PW1 and volume of ink droplets.

In the voltage pulse, the ratio between the drive voltage Von of the first pulse and the drive voltage Voff of the second pulse (|Von|/|Voff|) was 2, and the pulse width PW2 of the second pulse was set at 3AL (18.6 µsec). At the drive voltage (Von) wherein ink droplet velocity is 4 m/s, the width PW1 of the first pulse was changed at intervals of 0.5AL in the range from 1AL (6.2 µsec) to 12 times the AL (12AL: 74.4 µsec). Under these conditions, the position accuracies σx and σy of ink droplets, drive voltage (Von), and the volume of ink droplets jetted were measured FIGS. 8, 9 and 10 show the measured results.

To put it more specifically, ink position accuracies σx and σy indicate the standard deviations in the measurement of the displacement of 100 ink droplets on the substrate 6 when these ink droplets have been jetted from one and the same nozzle. The σx denotes the component in the direction of nozzle row, and σy indicates the component perpendicular to the nozzle row. As the σx and σy are smaller, the position accuracy is more improved.

Figure 8:
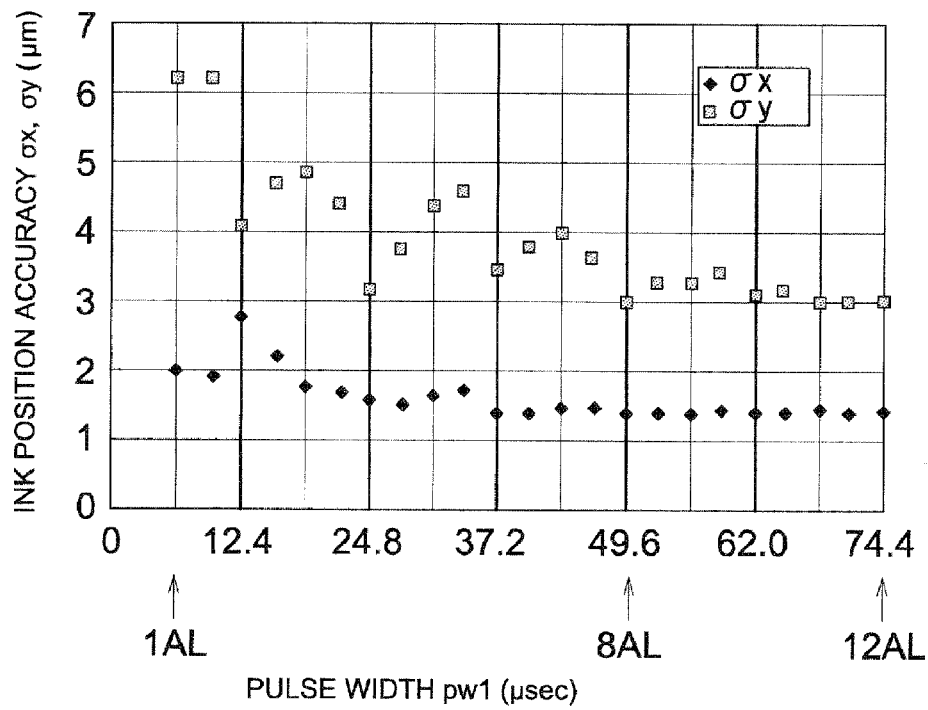
FIG. 8 is a chart showing the pulse width PW1 and the accuracy of ink droplets hitting the intended position.

FIG. 8 is a chart representing the result of measuring the pulse width PW1 and ink droplet position accuracies σx and σy. FIG. 9 is a chart representing the pulse width PW1 and drive voltage. FIG. 10 is a chart representing the pulse width PW1 and the volume of ink droplets.

FIG. 8 demonstrates that, as compared to the comparative example (1AL, 1.5AL) that fails to meet the requirement of the pulse width PW1 being twice the AL (2AL) or more, the present invention (2AL through 12AL) that meets this requirement ensures that position accuracy σy increases with the pulse width, and, when twice the AL (2AL) has been exceeded, ink position accuracy σx is improved.

When the width PW1 of the first pulse is an even number of times of the AL (2AL, 4AL, 6AL, 8AL, 10AL, 12AL), there is a remarkable improvement in the ink position accuracy σy.

FIG. 9 demonstrates that, when the width PW1 of the first pulse is an odd number of times the AL (3AL, 5AL, 7AL, 9AL, 11AL), the drive voltage is reduced.

What is claimed is:

1. An inkjet recording apparatus comprising a head which includes:
    a plurality of nozzles each of which jets ink containing spacer beads dispersed therein on a substrate;
    a plurality of pressure chambers respectively communicating with the plurality of nozzles;
    a plurality of electromechanical transducers, wherein a capacity of each pressure chamber is changeable by supplying a voltage pulse to corresponding ones of the plurality of electromechanical transducers, and wherein the ink is jettable from each nozzle by applying to the corresponding electromechanical transducers, the voltage pulse which includes a first pulse for increasing the capacity of the pressure chamber and then decreasing the capacity of the pressure chamber after a lapse of a predetermined time; and
    a drive signal generating section which generates the first pulse, wherein, when a half of an acoustic resonance period of a pressure wave in the pressure chambers is assumed as AL, a width of the first pulse is set to be at least twice of the AL and an even number of times of the AL,
    wherein the plurality of electromechanical transducers form partitions which separate adjacent pressure chambers and are made up of piezoelectric elements which deform in a shear mode when the voltage pulse is applied.

2. The inkjet recording apparatus of claim 1, wherein the voltage pulse further includes a second pulse which follows the first pulse, wherein the second pulse is for decreasing the capacity of the pressure chamber and then increasing the capacity of the pressure chamber after a lapse of a predetermined time.

3. The inkjet recording apparatus of claim 1, wherein the first pulse comprises a rectangular wave.

4. The ink-jet recording apparatus of claim 1, wherein the width of the first pulse is set to a width without exceeding 12 times of the AL.

5. The inkjet recording apparatus of claim 1, wherein the width of the first pulse is set to one of 4AL, 6AL, 8AL, 10AL and 12AL.

* * * * *